United States Patent [19]

Coulter et al.

[11] 4,270,633
[45] Jun. 2, 1981

[54] AUTOMATIC BRAKE ADJUSTER WITH AUTOMATICALLY ADJUSTED STEADY POINT

[75] Inventors: James L. Coulter, Fraser; Harald H. Lorenz, Orchard Lake, both of Mich.

[73] Assignee: General Motors Corporation, Detroit, Mich.

[21] Appl. No.: 112,162

[22] Filed: Jan. 16, 1980

[51] Int. Cl.³ ............................................. F16D 51/52
[52] U.S. Cl. ........................ 188/79.5 GC; 188/196 BA
[58] Field of Search ................. 188/79.5 GC, 79.5 B, 188/79.5 P, 196 BA, 79.5 R

[56] References Cited

U.S. PATENT DOCUMENTS

| | | |
|---|---|---|
| 2,938,610 | 5/1960 | Dombeck ................... 188/79.5 GC |
| 2,978,072 | 4/1961 | Burnett ...................... 188/79.5 GC |
| 3,050,157 | 8/1962 | Kenzik ....................... 188/79.5 GC |
| 3,103,261 | 9/1963 | Borgard ....................... 188/196 BA |
| 3,114,438 | 12/1963 | Helvern ..................... 188/79.5 GC |
| 3,221,842 | 12/1965 | Shampton .................... 188/79.5 R |

Primary Examiner—Robert R. Song
Attorney, Agent, or Firm—D. D. McGraw

[57] ABSTRACT

A duo servo drum brake has an adjusting lever pivoted on the secondary brake shoe and engaging the star wheel of an adjusting screw acting between adjacent ends of the primary and secondary brake shoes. An adjusting rod for operating the adjusting lever during forward braking actuation is pivotally connected to the secondary shoe rim near the adjusting lever, and the pivotal connection is infinitely adjusted for brake wear.

3 Claims, 5 Drawing Figures

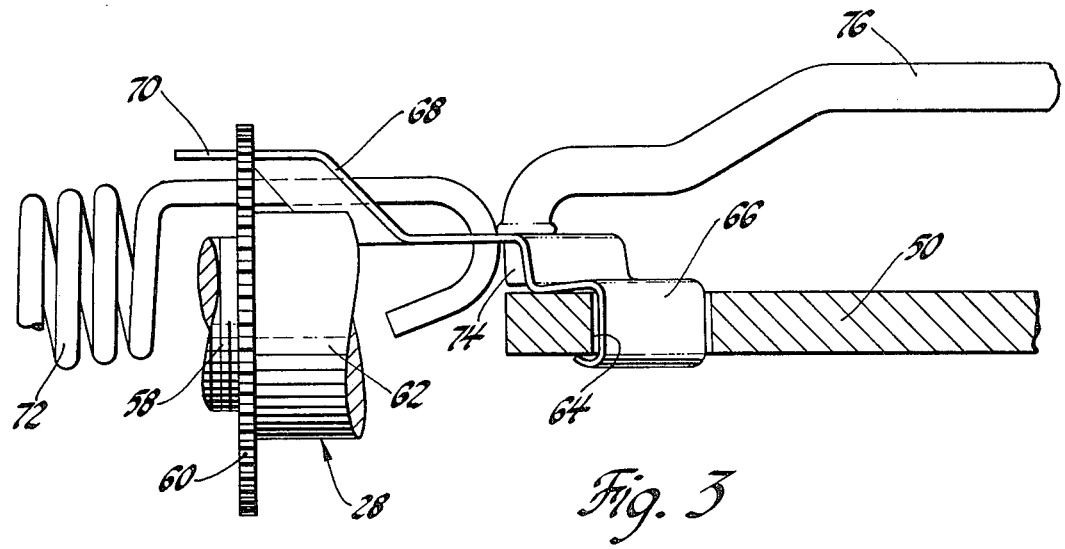
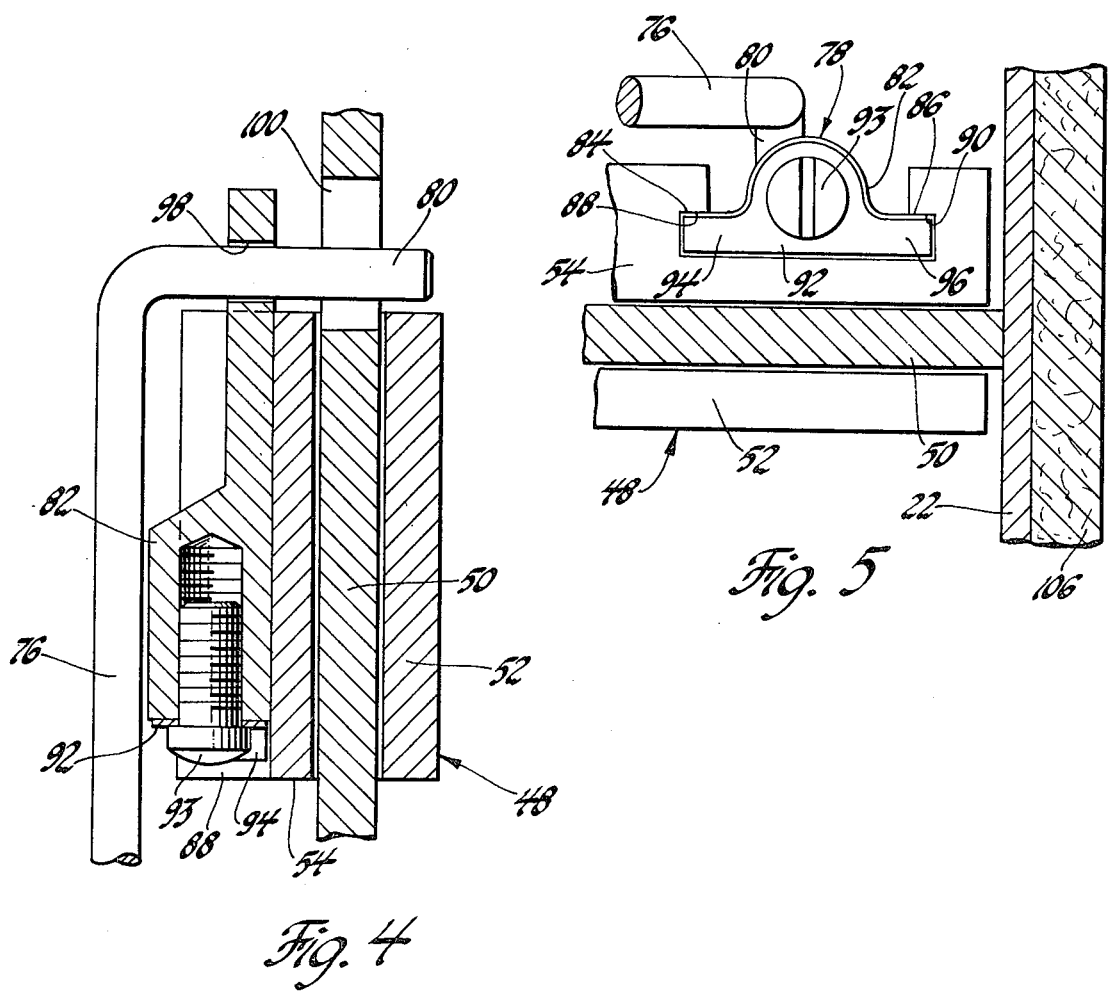

AUTOMATIC BRAKE ADJUSTER WITH AUTOMATICALLY ADJUSTED STEADY POINT

The invention relates to automatic brake adjusting mechanism in a duo servo brake, and more particularly to one providing for adjustment of the fixed point on which the adjusting lever reacts.

In normal operation of vehicle brakes of the duo servo type, brake adjustment is required because of the wear of the brake linings over a period of time and the resultant increase of the distance between the brake linings and the brake drum. This increase in distance normally results in the requirement for a greater travel of the wheel cylinder pistons in order to actuate the brake. This requires additional fluid displacement, leading to additional brake pedal travel before the brakes are applied. Automatic brake adjusters have been used for many years to alleviate this problem. Typical automatic brake adjusters are illustrated in U.S. Pat. Nos.: 2,978,072—Burnett; 3,050,157—Kenzik and Oakley; 3,114,438—Helvern; and 3,221,842—Shampton. Brake adjusting mechanisms of these types provide a fixed reaction point for the adjuster lever which operates the star wheel of the adjusting strut at a point either on or immediately adjacent the brake shoe anchor. Therefore some mechanism such as levers or wires or a combination thereof must be provided to lead this anchor point to the opposite side of the shoes from the anchor ends of the shoes to the area where the adjusting lever and strut are located.

The structure embodying the invention provides the reaction point upon which the adjusting lever reacts at a location much nearer the adjusting lever so that only a short rod is required to connect the adjusting lever with the reaction point. Furthermore, the reaction point is provided with an infinite adjusting arrangement so that the reaction point changes as the brake lining wears, maintaining the desired clearance between the brake linings and the brake drum by adjustment of the adjusting strut.

IN THE DRAWINGS

FIG. 3 is a fragmentary view of a portion of the adjusting mechanism, with parts broken away and in section, taken in the direction of arrows 3—3 of FIG. 1.

FIG. 4 is a fragmentary cross section view, with parts broken away and in section, taken in the direction of arrows 4—4 of FIG. 1.

FIG. 5 is a fragmentary cross section view, with parts broken away and in section, taken in the direction of arrows 5—5 of FIG. 1.

Figure 1:
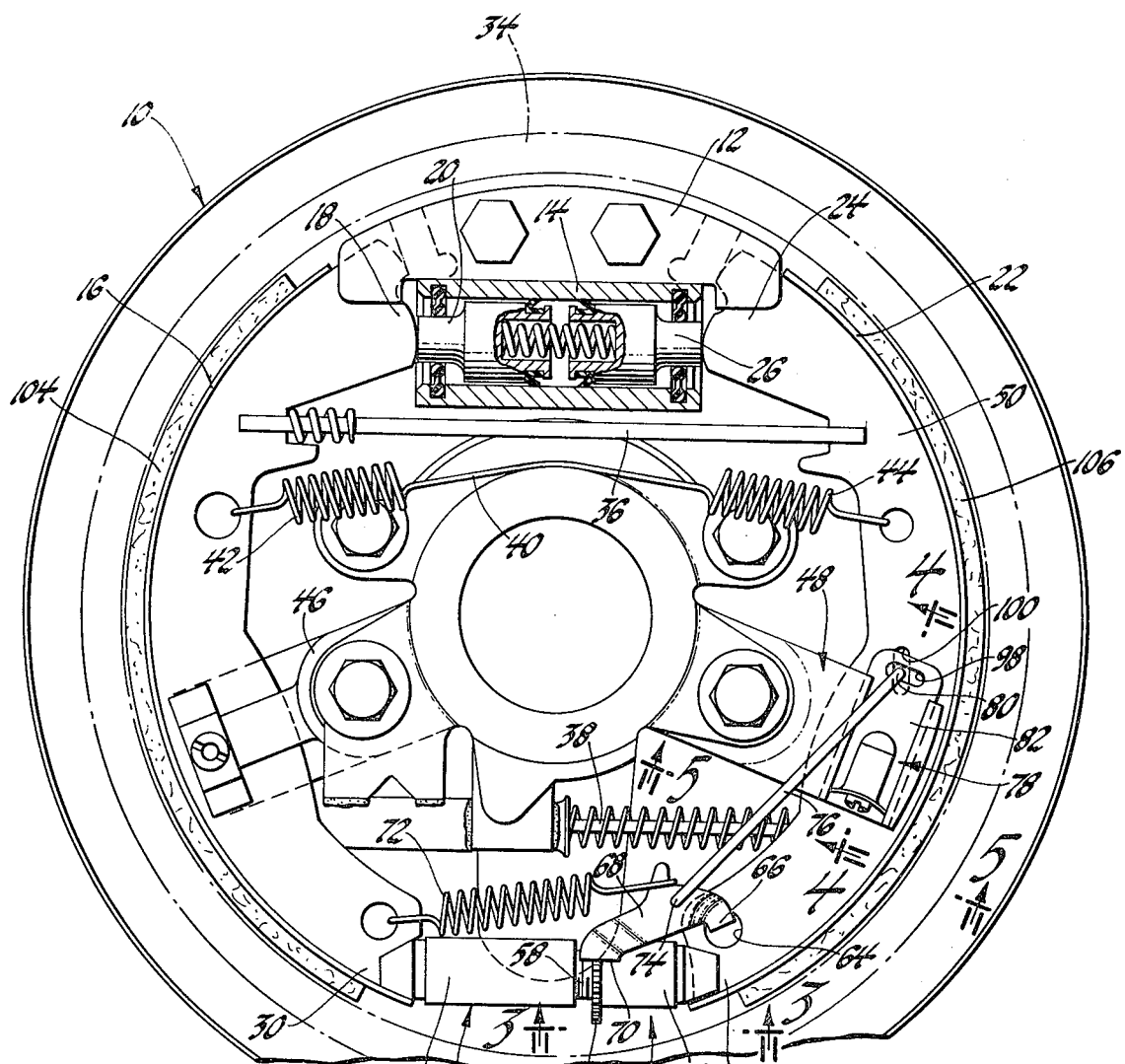
FIG. 1 is an elevation view with parts broken away and in section of a duo servo drum brake embodying the invention.

The duo servo drum brake assembly 10 includes a fixed support member 12, a wheel cylinder 14 mounted on the fixed support member and operable to be expanded under hydraulic pressure to actuate the brake, a primary brake shoe 16 having one end 18 in engagement with one plunger 20 of the wheel cylinder 14 for actuation thereby, a secondary brake shoe 22 having one end 24 in engagement with wheel cylinder plunger 26 for actuation thereby, a brake shoe adjusting strut assembly 28 positioned between the respective ends 30 and 32 of the primary and secondary brake shoes, and a brake drum 34. Assembly 10 is also illustrated as having a mechanically applied parking brake arrangement including the spreader strut 36 positioned adjacent the wheel cylinder 14 and engageable with the brake shoes 16 and 22, and suitable mechanism including a pull cable 38 connected to mechanism, not illustrated, for mechanically expanding the brake shoes into engagement with the brake drum. A retracting spring assembly 40 includes tension spring sections 42 and 44 and is connected at its opposite ends with the primary and secondary brake shoes to continually urge the shoe linings away from the brake drum and the brake shoe ends 18 and 24 into engagement with the wheel cylinder plungers 20 and 26.

Assembly 10 also has a pair of fixed arms 46 and 48 which extend outwardly from parts of the fixed support member 12. Arm 48 is shown in greater detail in FIGS. 4 and 5. Arm 46 is similarly constructed but without the pivotal point and adjusting mechanism to be described. Arm 48 is bifurcated so that the web 50 of the secondary brake shoe 22 is received between the arm sections 52 and 54. These sections therefore act as brake shoe guides, permitting the secondary brake shoe 22 to move outwardly toward the interior brake surface of drum 34 and to move inwardly upon brake release under the influence of retraction spring assembly 40. The shoe guide section 54 also operates as a reaction point adjuster guide, as will be later described.

The brake shoe adjusting strut 28 is of typical construction, and includes an internally threaded sleeve 56 having a slotted end fitting over the end 30 of the primary brake shoe, and particularly the web portion thereof. A threaded shaft 58 is threaded into sleeve 56 and carries a toothed wheel 60, commonly referred to as a star wheel. A sleeve 62 has a cylindrical end of the threaded shaft 58. Sleeve 62 also has a slotted end which fits over the web of secondary brake shoe 22 forming a part of the end 32 of that shoe. Rotation of star wheel 60 in one direction causes the threaded shaft 58 to extend further from sleeve 56, increasing the effective length of the adjuster strut 28 and therefore increasing the separation of the brake shoe ends 30 and 32. If the star wheel 60 is rotated in the other direction, the adjuster strut 28 is shortened and the brake shoe ends 30 and 32 are brought somewhat more closely together. Therefore any rotation of star wheel 60 will cause the brake shoes 16 and 22 to pivot about the points of engagement of their ends 18 and 24 with plungers 20 and 26 and approach or move further away from the brake drum 34.

A portion of the secondary brake shoe web 50 adjacent shoe end 32 is provided with an opening 64 which receives a pivot arm 66 of the adjusting lever 68. Arm 66 is formed on one end of lever 68 and the other end of the lever is formed to provide a pawl 70 which is engageable with teeth of star wheel 60 so that pivotal movement of the adjusting lever 68 in opening 64 in one direction will cause the star wheel 60 to rotate and increase the effective length of adjuster strut 28, while in the other direction the pawl will slip over a tooth of the star wheel 60 when sufficient pivoting movement of the lever 68 occurs, positioning the pawl for further adjustment of the star wheel. A tension spring 72 has one end connected to the adjuster lever 68 and the other end connected to the end 30 of primary brake shoe 16 so that the force of the spring tends to urge lever 68 to be pivoted in a counterclockwise direction as seen in FIG.

1. The arrangement of the pawl 70 and the star wheel 60 is such that counterclockwise pivoting movement of lever 68, resulting in downward movement of pawl 70 as seen in FIG. 1, is the direction of movement which will cause the star wheel to rotate to adjust the adjuster strut 28 to an increased length. An opening is provided in adjuster lever 68 at a point intermediate the pivot arm 66 and the pawl 70. The end 74 of the adjusting rod 76 pivotally extends through this opening, as seen in FIGS. 1 and 3.

Figure 2:
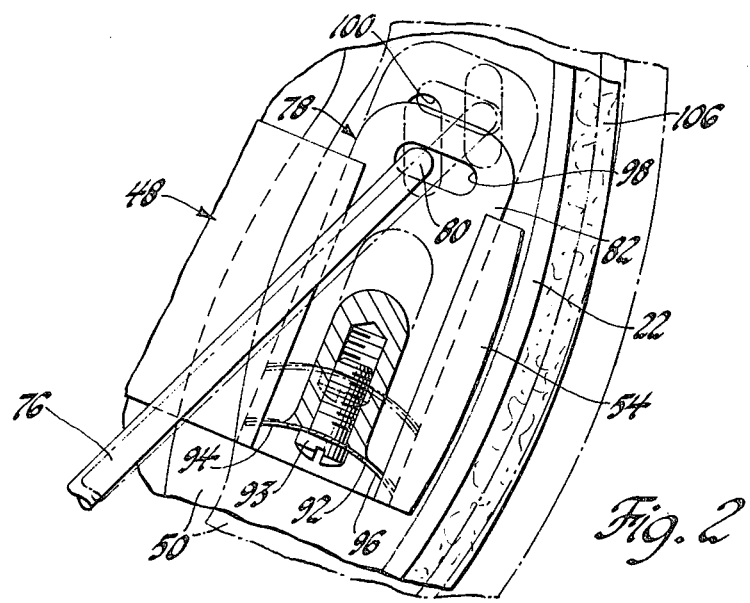
FIG. 2 is a fragmentary view, with parts broken away and in section, showing the reaction pivotal connection and its adjusting mechanism, an adjusted position being shown with phantom lines.

The pivotal connection adjusting mechanism 78 is illustrated in greater detail in FIGS. 2, 4 and 5. The other end 80 of adjusting rod 76 is connected to and forms a part of mechanism 78. The adjusting mechanism 78 includes a tongue-like body 82, the sides 84 and 86 of that body being respectively received in and slidable within channels 88 and 90 formed in a part of the shoe guide section 54. Body 82 is provided with a spring 92 centrally mounted by screw 93 on one body end, with the spring free ends 94 and 96 being respectively engageable with the bottoms of channels 88 and 90. Spring 92 is somewhat longer than the span between the bottoms of channels 88 and 90 so that it engages the bottoms at an angle which effectively permits the spring and body 82 to move in one direction but effectively prevents movement of the spring and body in the opposite direction. As seen in FIGS. 1 and 2, the permissible movement is away from the end 32 of secondary brake shoe 22. The end of body 82 opposite spring 92 has a transversely extending slot 98 formed therein through which adjusting rod end 80 extends. The secondary brake shoe web 50 has another slot 100 formed therein under slot 98 and extending skew relative to slot 98. Rod end 80 also extends through slot 100, as is clearly indicated in FIG. 4. The adjusting mechanism 102 for assembly 10 therefore includes the adjuster strut 28, adjusting lever 68, spring 72, adjusting rod 76, body 82, slots 98 and 100, and the adjuster guide and shoe guide section 54 of fixed arm 48.

The brake assembly is shown in FIG. 1 in its adjusted condition while the shoe linings 104 and 106 are relatively new and unworn. As illustrated by solid lines in FIG. 2, spring 92 is positioned near one end of the slot in which body 82 slides. The rod end 80 of adjusting rod 76 extends through slots 98 and 100, being located toward the left end of slot 98 as seen in FIGS. 1 and 2 and toward but spaced from the lower end of slot 100 as seen in those Figures. Upon brake actuation by pressurization of hydraulic fluid in wheel cylinder 14, plungers 20 and 26 are moved outwardly. Assuming that the vehicle in which the brake is installed is traveling in a forward direction at the time of braking, mechanical servo action of the primary shoe acting on the secondary shoe through strut 28 occurs when the shoes engage the brake drum 34. The force generated by the mechanical servo action of primary brake shoe 16 is exerted through strut 28 on secondary shoe 22 to further urge that shoe into brake engagement with the brake drum. This action is well known in the brake art. As the secondary shoe moves outwardly into engagement with the brake drum, the slot 100 in the secondary brake shoe web 50 is moved in a translatory manner illustrated in FIG. 2. This causes the adjusting rod 76 to move outwardly in slot 98 as much as the length of slot 100 permits, thus allowing the motion and causing no reaction to the brake adjusting mechanism.

The reaction point established by rod end 80 and slots 98 and 100 is automatically adjusted according to actual brake lining wear and this adjustment takes place gradually during regular forward brake applications. If, during forward brake application, the adjusting rod end 80 has moved outwardly as much as the oversized slot 100 permits and is still moving upward, the rod end 80 acts against the upper edge of slot 98, thus moving body 82 upwardly as seen in FIGS. 1 and 2. An adjusted position of the body 82 is illustrated in FIG. 2 in phantom lines. This adjustment of the body is permitted due to the one-way action of spring 92, and results in an adjustment of a fixed point on which the brake adjusting lever 68 reacts through the adjusting rod 76 during reverse braking.

When the brakes are applied while the vehicle is traveling in reverse, the secondary shoe 22 acts as a primary shoe and moves considerably more in the clockwise direction viewed in FIG. 1 as compared to its counterclockwise movement which occurred during forward braking. This movement causes the adjusting rod end 80 to push against the lower edge of slot 98, urging downward movement of the adjusting body 82. This attempted downward movement of the body is prevented by the one-way action of spring 92, and particularly the spring ends 94 and 96 as they engage the bottoms of the channels 88 and 90. The rod end 80 also presses against the inner edge of slot 100, which is being pressed radially outward by the hydraulic or manual input of the reverse brake application. This provides a definite anchor point for rod end 80 since the rod end is confined by the lower edge of slot 98 and the inner edge of slot 100. When the secondary brake shoe 22 and the opening 64 move during reverse brake application, they carry the adjusting lever 68 along in the same direction. However, the adjusting lever is restrained by the engagement of rod end 74, which pivotally extends through an opening in the adjusting lever 68. The secondary shoe movement in reverse brake application therefore causes the adjusting lever 68 to pivot about the pivotal engagement of its pivot arm 66 with the edge of opening 64. This causes the pawl 70 of the adjusting lever 68, which is in contact with the star wheel 60, to retract upwardly and to stretch the adjusting lever spring 72 further. If enough motion has been provided by the secondary shoe 22, which depends upon the amount of slack required to be taken up during brake application because of lining wear, the edge of pawl 70 will snap behind the next tooth of the star wheel 60. During release of the brake after reverse application the adjusting strut 28 is not under load and is therefore free to rotate. The adjusting lever spring 72 moves the adjusting lever 68 as the spring contracts, this movement being a pivotal movement about pivot arm 66 and opening 64, which becomes a downward movement of pawl 70. This movement causes the star wheel 60 to rotate, thus extending the effective length of adjusting strut 28 and adjusting the brake shoes to compensate for lining wear.

The embodiments of the invention in which an exclusive property or privilege is claimed are defined as follows:

1. In a duo servo drum brake having a primary brake shoe and a secondary brake shoe, brake shoe adjusting mechanism comprising:

an adjusting strut between adjacent ends of said brake shoes;

an adjusting lever pivotally mounted on said secondary brake shoe adjacent to said strut for adjusting said strut during reverse braking release as necessary because of brake wear;

means pivotally attached to said adjusting lever and to said secondary brake shoe and providing fixed reaction for said adjusting lever during reverse braking;

and means responsive to movement of said secondary brake shoe during forward braking application to move the effective point of pivotal attachment of said reaction means to said secondary brake shoe in accordance with secondary brake shoe wear to adjust the effective point of fixed reaction for said adjusting lever.

2. In a duo servo brake having a primary brake shoe and a secondary brake shoe, brake shoe adjusting mechanism comprising:

an adjusting strut between adjacent ends of said shoes;

an adjusting lever mounted on said secondary shoe adjacent to said adjusting strut for operating said adjusting strut;

spring means between said adjusting lever and said primary brake shoe acting during brake release to move said adjusting lever in a direction tending to operate said adjusting strut;

an adjusting rod having one end pivotally attached to said adjusting lever and the other end pivotally attached to said secondary brake shoe;

and means responsive to movement of said secondary brake shoe during forward brake application to move the point of rod pivotal attachment to said secondary shoe in accordance with brake shoe wear.

3. In a duo servo drum brake having a primary brake shoe and a secondary brake shoe;

brake actuating means and brake shoe adjusting means acting on said brake shoes;

a fixed support member mounting said actuating means and having brake shoe guide means thereon engaging said brake shoes and limiting movements of said brake shoes to a plane;

an adjusting lever pivotally mounted on said secondary shoe adjacent to and operable in stepwise fashion on said adjusting means;

an adjusting lever spring connecting said adjusting lever and said primary shoe and urging said adjusting lever in an adjusting direction relative to said adjusting means;

the improvement comprising:

an adjusting rod having one end pivotally connected to said adjusting lever and the other end pivotally connected to said secondary shoe to provide a reaction point for said adjusting lever, the pivotal connection to said secondary shoe including a slot within which the other end of said rod may slide;

and pivotal connection adjusting means slidably supported on said fixed support member and having a slot therein extending angularly across said slot in said secondary shoe, the other end of said adjusting rod extending through both of said slots so as to be pivotally confined, said pivotal connection adjusting means being slidable in only one direction relative to said fixed support member and movable by said adjusting rod upon sufficient movement of said secondary shoe during forward brake application to adjust the pivotal connection point of the other end of said adjusting rod within said secondary shoe slot and provide adjustment of the pivot point of the other end of said rod to said secondary shoe in accordance with secondary brake shoe lining wear, said rod and said adjusting lever spring acting upon reverse brake release to pivotally move said adjusting lever sufficiently to adjust said adjusting means as needed in accordance with brake lining wear.

* * * * *